United States Patent [19]
Klein et al.

[11] Patent Number: 5,596,715
[45] Date of Patent: Jan. 21, 1997

[54] METHOD AND APPARATUS FOR TESTING HIGH SPEED BUSSES USING GRAY-CODE DATA

[75] Inventors: Philippe Klein, Newton; David W. Maruska, Hopkinton; Kevin W. Ludlam, Stow, all of Mass.

[73] Assignee: Digital Equipment Corporation, Maynard, Mass.

[21] Appl. No.: 514,348

[22] Filed: Aug. 4, 1995

Related U.S. Application Data

[63] Continuation of Ser. No. 88,290, Jul. 6, 1993, abandoned.

[51] Int. Cl.⁶ .......................... G06F 11/00; G01R 31/28
[52] U.S. Cl. .................. 395/183.19; 371/24; 371/25.1
[58] Field of Search .................................. 371/20.1, 49.1, 371/55, 24, 25.1, 48, 69.1, 70; 395/183.19, 185.05

[56] References Cited

U.S. PATENT DOCUMENTS

| | | | |
|---|---|---|---|
| 4,208,650 | 6/1980 | Horn | 371/47 |
| 4,216,539 | 8/1980 | Raymond et al. | 371/20 |
| 4,339,819 | 7/1982 | Jacobson | 371/16 |
| 4,493,081 | 1/1985 | Schmidt | 371/38 |
| 4,500,993 | 2/1985 | Jacobson | 371/16 |
| 4,523,323 | 6/1985 | Nakajima et al. | 375/37 |
| 4,622,669 | 11/1986 | Pri-Tal | 371/25 |
| 4,672,307 | 6/1987 | Breuer et al. | 324/73 |
| 5,117,420 | 5/1992 | Hillis et al. | 370/60 |

Primary Examiner—Robert W. Beausoliel, Jr.
Assistant Examiner—Norman M. Wright
Attorney, Agent, or Firm—Lindsay G. McGuinness; Denis G. Maloney; Arthur W. Fisher

[57] ABSTRACT

An apparatus for providing data to an I/O bus at the maximum I/O bus bandwidth comprises an exerciser unit coupled to the I/O device. The exerciser unit includes DMA circuitry for providing a constant stream of transactions to the I/O bus. Each transaction provides a plurality of data quadwords to the I/O bus which are parity protected. The exerciser unit includes a memory device for storing data to be provided for each transaction, and a parity circuit for calculating and providing parity for the data stored in the memory. The exerciser unit further includes a data generation device for providing both data having predictable parity and the parity to the bus for each bus cycle while bypassing the parity generation logic to provide data at maximum bandwidth. The data generation device provides a sequence of different data bytes using a modified Gray-code algorithm, which facilitates parity generation for each byte in the sequence of bytes.

6 Claims, 6 Drawing Sheets

| | 31 30 29 28 27 26 25 24 23 22 21 20 19 18 17 16 | 15 14 13 12 11 10 9 8 7 6 5 4 3 2 1 0 | |
|---|---|---|---|
| LW0 | st \| wb \| \| FH \| PHA \| WR \| RU \| RP \| | CRC_LANE_7 | CRC_LANE_6 | 81a |
| LW1 | HL \| R \| CAP \| DISCONNECTION PHASE CMD | DATA PHASE CMD | CONNECTION PHASE CMD | 81b |
| LW2 | CC \| AW \| DW \| BDP \| B_L \| BYTE LANE DESELECT | CRC_LANE_5 | CRC_LANE_4 | 81c |
| LW3 | | TOTAL DATA BEAT COUNT | S\|C\|T\|C\|D\|S\|F\|F L\|S\|E\|P\|P\|D\|C | 81d |
| LW4 | FBUS ADDRESS <63:48> | CRC_LANE_3 | | 81e |
| LW5 | BADPAR DATA_BEAT | PACKET RAM ADDRESS | | 81f |
| LW6 | FBUS ADDRESS <15:00> | CRC_LANE_1 | CRC_LANE_0 | 81g |
| LW7 | FBUS ADDRESS <47:16> | | 81h |
| LW8 | WRITE_BUFFER_LINK | STATE_ID | | 81i |

FIG. 3

METHOD AND APPARATUS FOR TESTING HIGH SPEED BUSSES USING GRAY-CODE DATA

This application is a continuation, of application Ser. No. 08/088,290, filed Jul. 6, 1993, now abandoned.

BACKGROUND OF THE INVENTION

This invention relates generally to computer systems and more particularly to testing of busses of computer systems.

As it is known in the art, a computer system includes inter alia a central processing unit for processing an instruction set, a memory to store instructions, a bus to interconnect the memory to the CPU and an Input/Output (I/O) interface to couple I/O buses and I/O devices to the CPU. In many computer systems a memory device controller often includes logic to perform Direct Memory Access (DMA) which is used by the CPU to transfer large blocks of information amongst the memory, the central processor and I/O devices. The Input/Output (I/O) device, coupled to the system bus provides an interface between external devices and the memory and central processing unit. The external devices are generally coupled to the I/O device by an I/O bus.

In many computer system applications such as in computer networks, the I/O busses are high speed transmission systems which allow for a transfer of large blocks of data between the external device and memory. For example, an external device may be a console device, a graphics device, a printer, a disk, or a network interface.

Often the I/O bus, particularly an I/O bus used in network applications, is capable of transferring data at a much higher bandwidth than the processing system. This is desirable to prevent the processor from wasting processing time while it waits for data to be transmitted over the I/O bus. Moreover, in networked applications often many computer systems are interconnected to a common I/O bus and therefore the bus needs sufficient bandwidth to adequately service all of the systems on the bus.

One type of bus protocol has the external device and the I/O device communicating using an asynchronous, master/slave interface protocol. According to the master/slave protocol, one device (the master) sends out a request for data over the bus, and awaits an acknowledgement from the external device that the request has been received. The slave device acknowledges the receipt of the request, and executes the instruction from the master device. For example, if the master device requested a write, it would send out the write request, and not proceed executing a subsequent request until it receives the acknowledgement from the slave device. In this manner, the master/slave protocol thus ensures that I/O requests are not dropped without execution by the slave device.

As with any other computer system device testing of the device is often performed to insure that the device is operating properly. Testing is also performed to insure that the design is free of flaws.

Due to the high bandwidth of the I/O bus, it is often difficult during the manufacturing of computer systems to ensure that the I/O bus, and its associated interfaces are operating as expected according to the bus protocol. It is often difficult to discover errors in the I/O bus interface design since many of the design flaws will not arise until the bus is operating at or near its maximum capacity, that is using the full bandwidth of the I/O bus.

Thus, it would be desirable to thoroughly test the I/O bus at a bandwidth which approaches the maximum bandwidth of the I/O bus levels, before the I/O bus interfaces are actually integrated and running in the computer system. Testing the I/O bus at maximum bandwidth is further complicated due to the fact that parity generation is generally provided in the I/O data path, which increases the propagation delay of I/O data before it reaches the I/O bus. The time required for parity generation directly subtracts from the speed at which data can be provided to the bus.

SUMMARY OF THE INVENTION

In accordance with the present invention, a method of testing a bus driving a plurality of bytes of data and operating at maximum bandwidth comprises the steps of providing a sequence of transactions on the bus, where the data provided for each transaction on the bus is different by one bit value, and providing a parity bit corresponding to said provided data. The method for providing a sequence of transactions further comprises the step of providing, for each transaction, a fixed data value for a group of the plurality of bytes and a different data value for at least one of the other bytes of said plurality of bytes, wherein the value of said at least one of said other bytes differs from the value of a corresponding other byte in a previous transaction by one bit location. In addition, the method of providing a parity bit for each transaction includes the step of inverting the parity bit provided in a previous transaction. With such an arrangement, different data for each transaction is provided with correct parity and can readily be identified at the receiving end of the bus.

BRIEF DESCRIPTION OF THE INVENTION

The above-mentioned and other features of the invention will now become more apparent by reference to the following description taken in connection with the accompanying drawings in which:

FIG. 3 illustrates the layout of the fields of a transaction stored in the packet memory shown in FIG. 1.

DESCRIPTION OF THE PREFERRED EMBODIMENT

Figure 1:
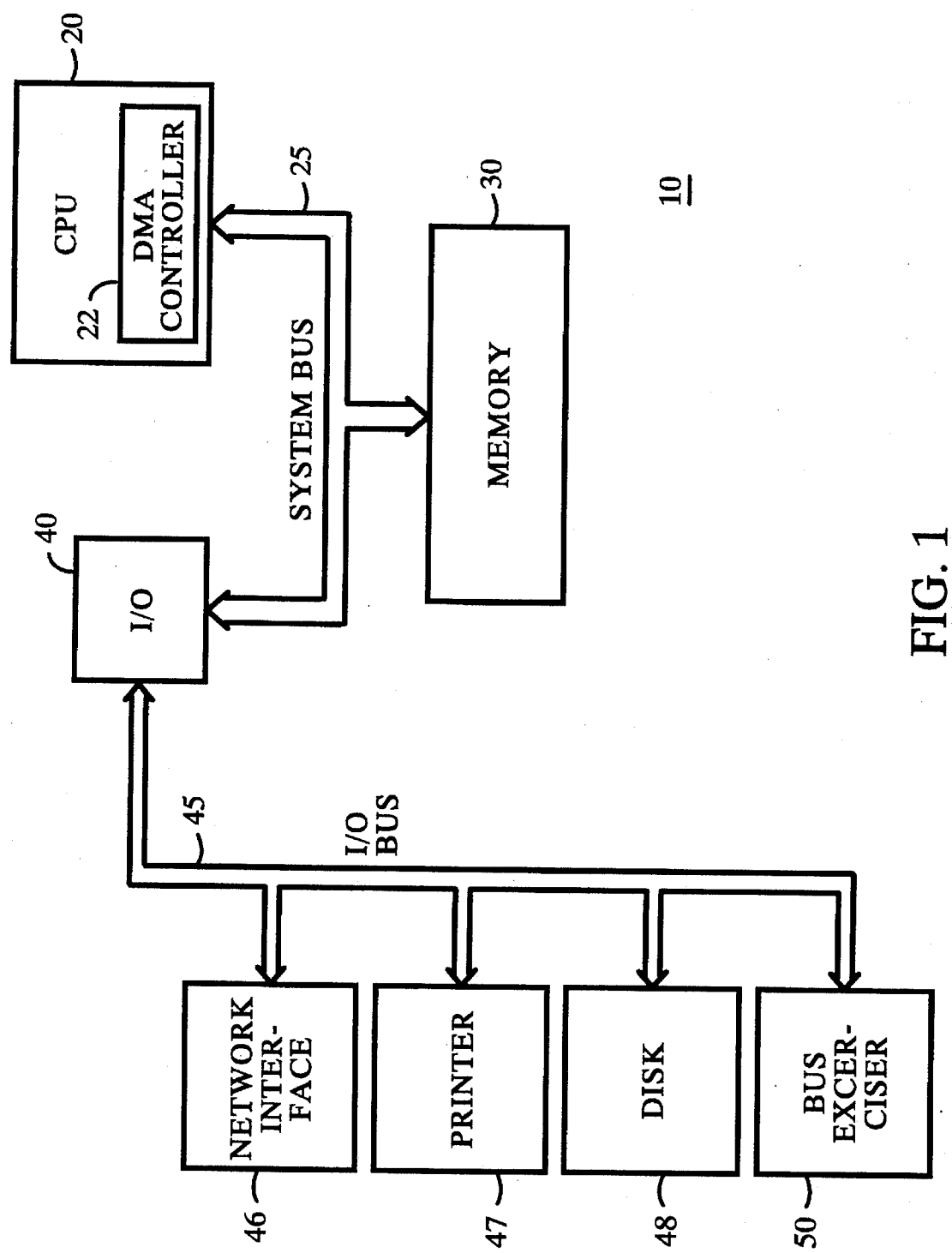
FIG. 1 is a block diagram of a computer system including an I/O bus.

Referring now to FIG. 1, a computer system 10 is shown to include a CPU 20 for processing an instruction stream. The CPU 20 is coupled to a memory unit 30 via system bus 25. An I/O unit 40 is also coupled to communicate with the memory 30 and the CPU 20 via the system bus 25. The I/O device is used to interface external devices 46, 47, 48, and 50, which may include, for example, a network interface, a printer, or a disk to the CPU 20. The external devices 46–47 are coupled to the I/O device 40 via an I/O bus 45, which is used to transfer data at a high bandwidth between the external devices and the CPU 20. One example of a high bandwidth bus is the Future Bus® which is capable of transferring data at 200 Megabytes/second.

Here, the I/O device 40 exchanges data with the external devices 46–48, and 50, using an asynchronous communication protocol. That is, when one device needs to communicate with another device, it places a request out on the I/O bus 45. Because this device initiates the request, it is referred to as the master device for this transaction. An external device responds to the request by returning an acknowledgement signal, indicating to the master device that it has received the request, and has executed the required instruction. This responding device is the slave device, for this transaction.

The computer system 10 is shown to further include a bus exerciser 50 which here includes a Direct Memory Access controller 65 which provides transactions on the I/O bus 45 while the computer system 10 is running to uncover design flaws which may only be discernable when the I/O bus 45 is operating at maximum bandwidth.

DMA controllers are often used to transfer data between the external devices and the memory unit. Direct memory access (DMA) allows for large amounts of data to be transferred between devices using only one bus transaction by a CPU to initiate transfer of the data. DMA is often used to transfer large blocks of data (for example, as many as 64 quadwords) between CPU, memory and I/O with minimal intervention by the CPU, thereby conserving processor time and more importantly not tying up the system bus with multiple, discrete data transfers (such as one quadword).

For example, DMA may be used for transferring an image from memory 30 to a printer device 47. Generally, the DMA controller will transfer blocks of data in response to a request. After the data transfer, however the DMA controller will be idle until a new request and a new block of data are provided to the controller.

Figure 2:
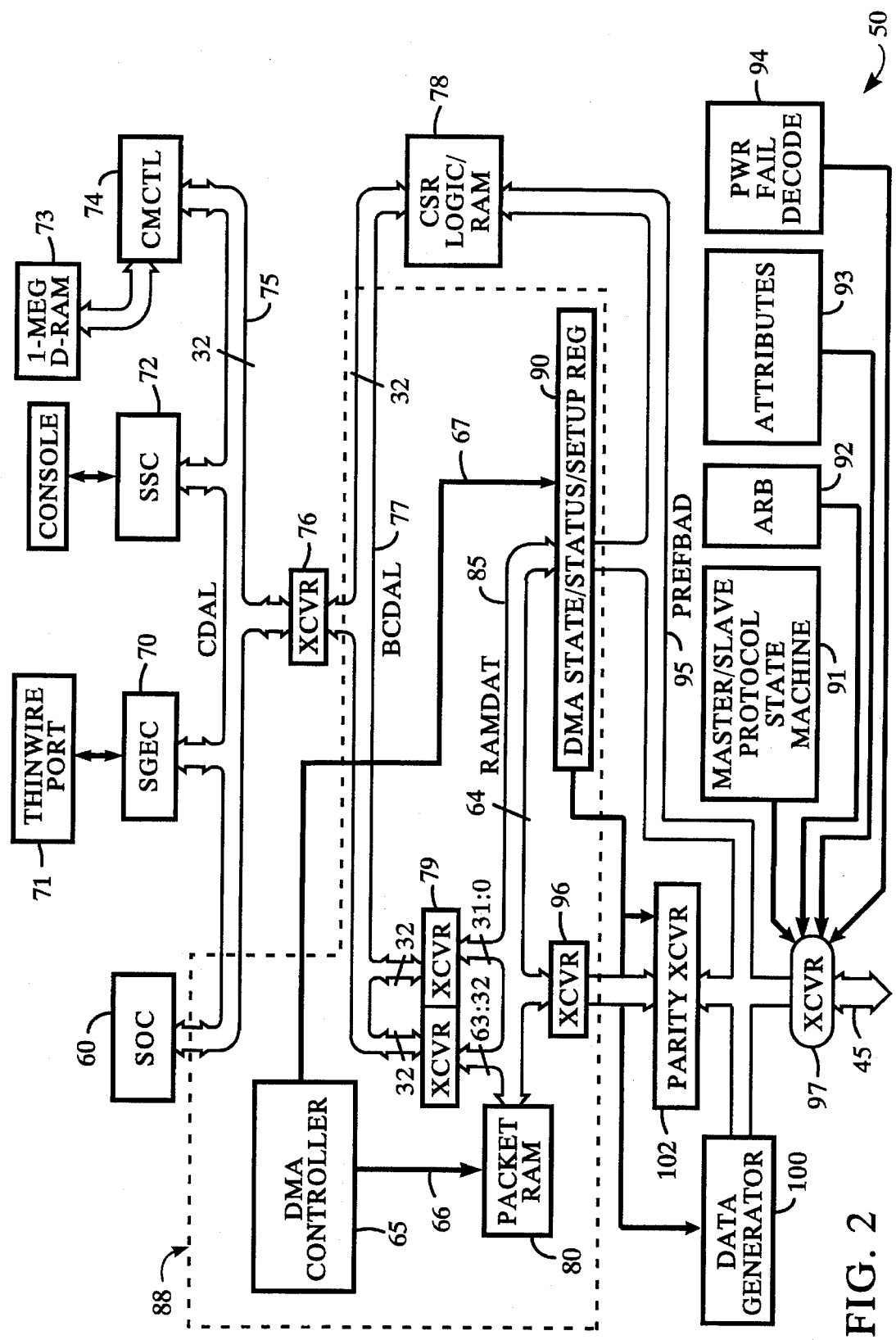
FIG. 2 is a block diagram of an exerciser unit which is coupled to the I/O bus of FIG. 1.

Referring now to FIG. 2, the bus exerciser unit 50 is shown coupled to the I/O bus 45 and provided to perform transactions on the I/O bus 45 to uncover problems with other I/O units coupled the I/O bus 45.

During fabrication of a computer system, the master/slave protocol, and interfaces between the external devices and the I/O device should be carefully tested to ensure that they operate properly. The exerciser unit 50 can provide many functions for testing the I/O bus. An individual exerciser unit 50 may be coupled to the I/O bus 45, or a pair of exerciser units may both be coupled to the I/O bus to communicate as a master/slave device. Generally, the exerciser unit can be used to test the I/O bus 45 as follows.

In this example, an exerciser unit 50 may be used to force a slave timeout on the I/O bus 45. That is, the exerciser unit 50 forces an instruction sequence which causes another I/O unit to request information from the exerciser unit 50, putting the exerciser unit 50 in slave mode. The exerciser unit 50 then fails to respond. According to the protocol, the I/O unit under test then re-initiates the request to the slave device, and may notify the CPU that there has been a slave device timeout.

The exerciser unit 50 may also be used to force parity errors and protocol errors on the bus. The exerciser unit 50 can operate in master and slave mode, depositing data on the I/O bus which includes parity errors. According to the bus protocol, I/O unit under test then logs the parity error, and signals the CPU 20 that a parity error has occurred. The request may be re-initiated or the CPU 20 may take appropriate steps to notify the user of the parity error. In addition, the exerciser unit 50 may violate the given protocol, by not providing an acknowledgement signal when necessary, or by not following other handshaking procedures. Or, the exerciser unit 50 may be used simply as a master device, to check the slave responses of other I/O units coupled to the I/O bus 45.

Another way in which the exerciser unit 50 may be used is in traffic mode. In traffic mode, one exerciser unit 50 is coupled to the I/O bus as a master device. The master device continuously provides transactions to the memory device 73 (FIG. 1) over the I/O bus 45, thus saturating both the I/O bus 45 and the system bus 25 with a constant stream of memory transactions and using the full bandwidth of the I/O bus 45.

The exerciser unit 50 is shown to include a processor 60 which processes an instruction set stored in memory in the processor (not shown) to control the functions of the exerciser unit 50 in testing the bus 45. The processor 60 is coupled to a communications controller 70 by an exerciser system bus 75. The communications controller 70 allows the exerciser 50 to communicate directly over a network interface 71. This port is provided in the event that there is a problem with the I/O bus 45. The network interface 71 will permit the exerciser unit 50 to communicate with the computer system 10.

Also coupled to the exerciser system bus 75 is a console controller 72, which allows a console (not shown) to directly communicate with the exerciser unit 50 for performing system startup and diagnostics. In general a console allows for operator intervention in the event of errors in processing and during startup of the computer system. The exerciser 50 also includes onboard memory 73, controlled by a memory controller 74. Memory 73 permits storage of data during execution of software by the exerciser unit 50 which performs exerciser specific instructions.

The exerciser unit 50 further includes a DMA subsystem 88 coupled to the exerciser system bus 75. The DMA subsystem 88 permits the exerciser 50 to constantly saturate the I/O bus 45 with transactions without having to directly interface to the processor 60 for each bus transaction or to the CPU 20. The DMA subsystem 88 includes a DMA controller 65 used during traffic mode to continuously provide transactions to the I/O bus 45, and as will be discussed in more detail later in the specification.

In a typical system, the exerciser processor 60 can process instructions to provide a constant data stream at a rate of about 20 megabytes/second, whereas a typical example of the I/O bus 45 may transfer data at 200 megabytes/second. Therefore the processor 60 is unable to interface with the I/O bus 45 at a bandwidth which would effectively test the bus protocol and various device interfaces.

The DMA subsystem 88 which is shown to include the DMA controller 65, located in the processor 60, a packet memory 80, and a DMA output register 90 is capable of transferring transactions to the I/O bus at or near that rate. That is, the DMA controller 65 permits the exerciser 50 to provide a sufficient number of transaction on the bus to operate the bus at or close to its maximum bandwidth in traffic mode. The DMA system 88 also includes a random access memory 80 which has stored therein packets or groups of data corresponding to commands necessary to initiate transactions on the I/O bus 45. These transactions are repeatedly provided to the I/O bus 45. Each transaction is loaded by the DMA controller 65 into a DMA output register 90 via bus 85. The DMA output register 90 is addressed via enable lines 67 by the DMA controller 65 to provide data to the output transceivers 97 at the maximum bandwidth rate of the I/O bus 45.

In the event that the transaction is a write transaction, data for the write transaction is either stored in the packet data portion 87 of the packet ram 80, or generated by a data generation block 100, depending on the type of transaction, which is indicated by a transaction descriptor which is stored in packet memory 80.

Referring now to FIG. 3, each transaction descriptor identifying the transaction which is to be preformed on the I/O bus 45 here includes 9 longwords of data. As mentioned previously, each transaction descriptor includes an instruction, such as a read or a write, which is to be placed on the I/O bus 45. Depending on the type of transaction, certain fields of the descriptor may not be relevant to a given transaction. For example, the DMA transaction includes 64 bits of CRC (shown in longwords 0, 2, 4, and 6) which the DMA controller 65 compares to a generated CRC on DMA reads. Alternatively, for a write transaction, this data is the CRC data that is provided for the write data.

There are generally three phases of a given transaction. First is the connection phase, when the handshake between devices is initiated by the protocol. Second is the data phase, when data is being transferred between I/O devices. Third is the disconnect phase, when the I/O devices proceed with handshake signals to end the transaction.

FIG. 3 shows an organization of data in the packet memory 80 for each transaction descriptor. Longword 0 includes the fields FH, PA, WR, RU, and RP. The FH field is a one bit field used to establish a fast handshake. This is only used during a write transaction, and is the bit which signals whether or not the data for the write transaction is to be supplied from the packet ram 80 or from the data generator 100. The PA field indicates whether it is a partial transaction, that is a read partial or write partial. A partial transaction is one in which less than a full quadword of data is to be transferred. The WR bit indicates when it is a write transaction. The RU bit indicates if it is a Read unlocked transaction. The RP bit is set when the transaction is a read partial transaction. The CRC_LANE_7 to CRC_LANE_6 fields are byte fields which contain CRC bits, as discussed previously.

The fields of Longword 1 include the HR field, the LR field, the CAP field, the Disconnection Phase CMD field, the Data Phase Cmd field, and the Connection phase command field. The HR field is set for High priority requests, when the exerciser wants to send a high priority request to the central arbiter of the I/O device 40 (FIG. 1). The LR bit is set for low priority requests. The CAP bit field is a 4 bit field which contains the master capability signals that will be driven on the bus during the transaction. The Disconnection Phase CMD field is a byte field which includes command bits which are gated onto the I/O bus 45 during a data phase by the master state machine, that is when the exerciser is operating as a master device an executing the disconnection handshake according to the bus protocol. The Connection phase command includes command bits which will be gated onto the I/O bus during the connection phase by the master state machine.

Longword 2 includes the fields of CC, AW, DW, BDP B_L, Byte Lane deselect, CRC_lane 5, and CRC_lane 4. The CC bit indicates that a CRC check should be done at the receiving end of the transaction. The AW bit indicates that the address field of the transaction is 64 bits, the DW bit indicates that the data field is 64 bits in width, the BDL B_L field is used to force bad parity, and the Byte Lane deselect is used to select byte lanes on the I/O bus 45, that is the bytes of the data which are valid. For example, if the I/O bus 45 transaction is a read or write partial transaction, each set bit in this field represents the byte lanes which will be ignored. For a read partial, the master will not store the byte lane in memory and no CRC will be checked. For a write partial, the slave will not store the byte lane in memory. The CRC_lane 5 and CRC_lane 4 field, as discussed previously are CRC byte fields which are valid and compared to the generated CRC for the corresponding bye lane only if that byte lane is enabled.

Longword 3 includes the Total Data Beat Count field, the SL field, the CS field, the TE field, the CO, DO, SP, FD and FC fields. The Total Data Beat Count is used to indicate the number of data beats that are needed to retire the current DMA transaction. A data beat is one bus transfer of data over the I/O bus. The data beat number can be determined by the byte width of the I/O bus, and width of the data.

The SL bit is the selected during Disconnection phase. The CS bit is set to indicate conflict status. The TE bit is the Transaction Error bit, which may be set during the disconnection phase to indicate an error in the transaction. The CP bit is used to force bad parity in the connection phase. The DP bit is used to force bad parity in the data phase. When set, this will cause bad parity to be forced on either the command or data, as indicated by the FC (force command) or FD (force data) fields. The SP field is also used to force bad parity in the disconnection phase, either on the data or command as indicated by the FC and FD data bits.

Longword 4 includes the fields I/O bus address, CRC_LANE, and CRC_LANE 3. The I/O bus address is the 16 bits of the start address of the I/O transaction in 64 bit address mode. The CRC_lane, and CRC_LANE fields are compared to generated CRC fields on a write, as discussed previously.

Longword 5 includes the fields BADPAR DATA_BEAT, and PACKET RAM ADDRESS. The BADPAR DATA_BEAT field represents a count when the exerciser unit will force bad parity on the data during the data phase. For example, when this count is set to 4, then on the fourth data beat the exerciser unit bill force bad parity. If the transaction is not stored, then the exerciser unit 50 will force bad parity every 16th data beat from the first assertion of bad parity.

Longword 6 includes the fields of I/O ADDRESS <15:0> and CRC_LANE, and CRC_LANE fields. The I/O bus address field contains the lower two bytes of the I/O bus address (the upper address fields being includes in Longword 4). The CRC_LANE and CRC_LANE fields include bits which are valid and compared to the generated CRC for write operations.

Longword 7 includes bits 47:16 of the I/O address field in 64 bit address mode and the bits 31:16 of the start address of the I/O transaction in 32 bit address mode.

Longword 8 includes the write buffer link, and the State ID for the transaction. The State ID is used to identify which transaction is currently being processed. The write buffer link is an address to the packet data portion 87 of memory 80 where the original data and CRC for a write transaction is stored. A write/read pair of transactions is here used to ensure that even when the bus is operating at full bandwidth, the external devices are operating as expected.

The descriptors for each DMA transaction are provided by a console command DMA_GEN, issued by the user. Each field of the transaction is entered using the appropriate qualifier.

CONSOLE>DMA_GEN –cm write_un –fl 7000 –dw 64 –bc 16
  –fs                                                           1 Equation I By way of Example, referring now to Equation I, above, the −cm field is the command field, which defines the type of FBUS transaction that the bus exerciser 50 performs as a master, and asserts the WR bit and the TC field accordingly. In the above example, the command is a write unlocked request. The −fl qualifier is used to define the low order bits of the I/O bus address, I/O address<31:0>, which in this example is 7000 hex. The −dw qualifier is used to define the data_width field, which in this example is 64 bits. The −db qualifier is used to define the data beat count, the total number of data cycles used in the transaction, in the present case 16. The −fs qualifier sets the FH (fast handshake) bit from Longword 0 to a 1, to thereby enable fast handshake mode.

Figure 4:
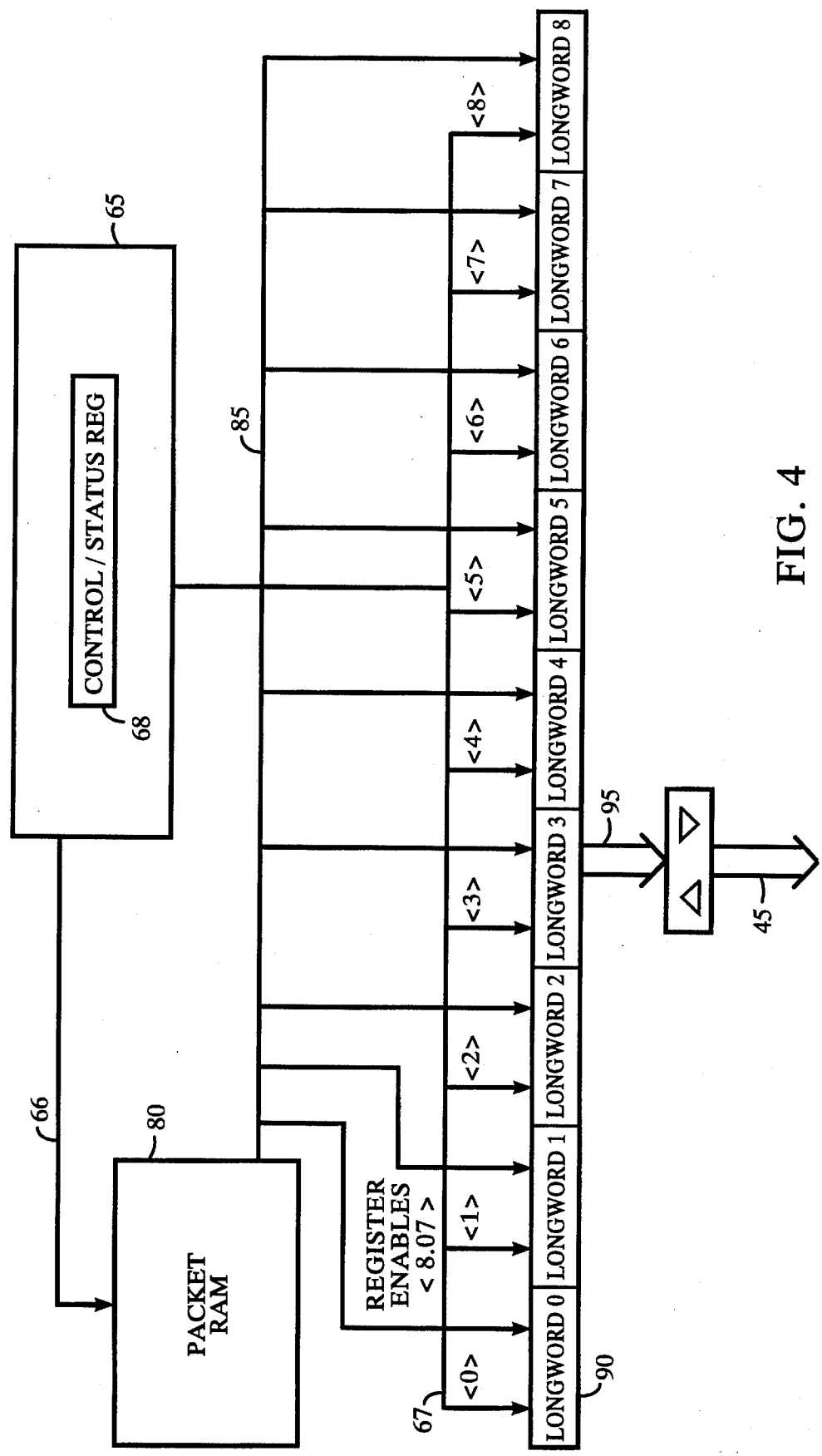
FIG. 4 is a block diagram illustrating the loading of the transaction of FIG. 3 into a DMA output register for issuance over the I/O bus of FIG. 1.

Referring now to FIG. 4, the DMA controller 65 operates in conjunction with the RAM memory 80 containing the packet data and a control/status register 68 as follows. The DMA controller 65 sequentially addresses the memory 80, which provides two longwords of data each cycle to fill up the DMA output register 90. Once the DMA output register 90 has been loaded with all the information for the given transaction (that is, the first 8 longwords or 8×32 bits of data), the DMA controller 65 requests control of the I/O bus 45 from the bus arbiter 92 (FIG. 2). When the bus 45 is next available, the registers are sequentially enabled to provide 2 longwords or 64 bits of data out onto the bus for each bus cycle.

For a read or write transaction, the data beat portion of longword 3 indicates to the DMA controller 65 exactly how many bus cycles of data will be read into or out of packet data memory 80. For a write transaction, the DMA controller provides the correct number of quadwords of data from the packet data portion 87 of memory 80 according to the data_beat count and the write buffer link field of longword 8, until all the write data has been forwarded onto the bus. For a read transaction, the DMA controller allows the correct amount of quadwords to be written into the packet ram 80.

Figure 5:
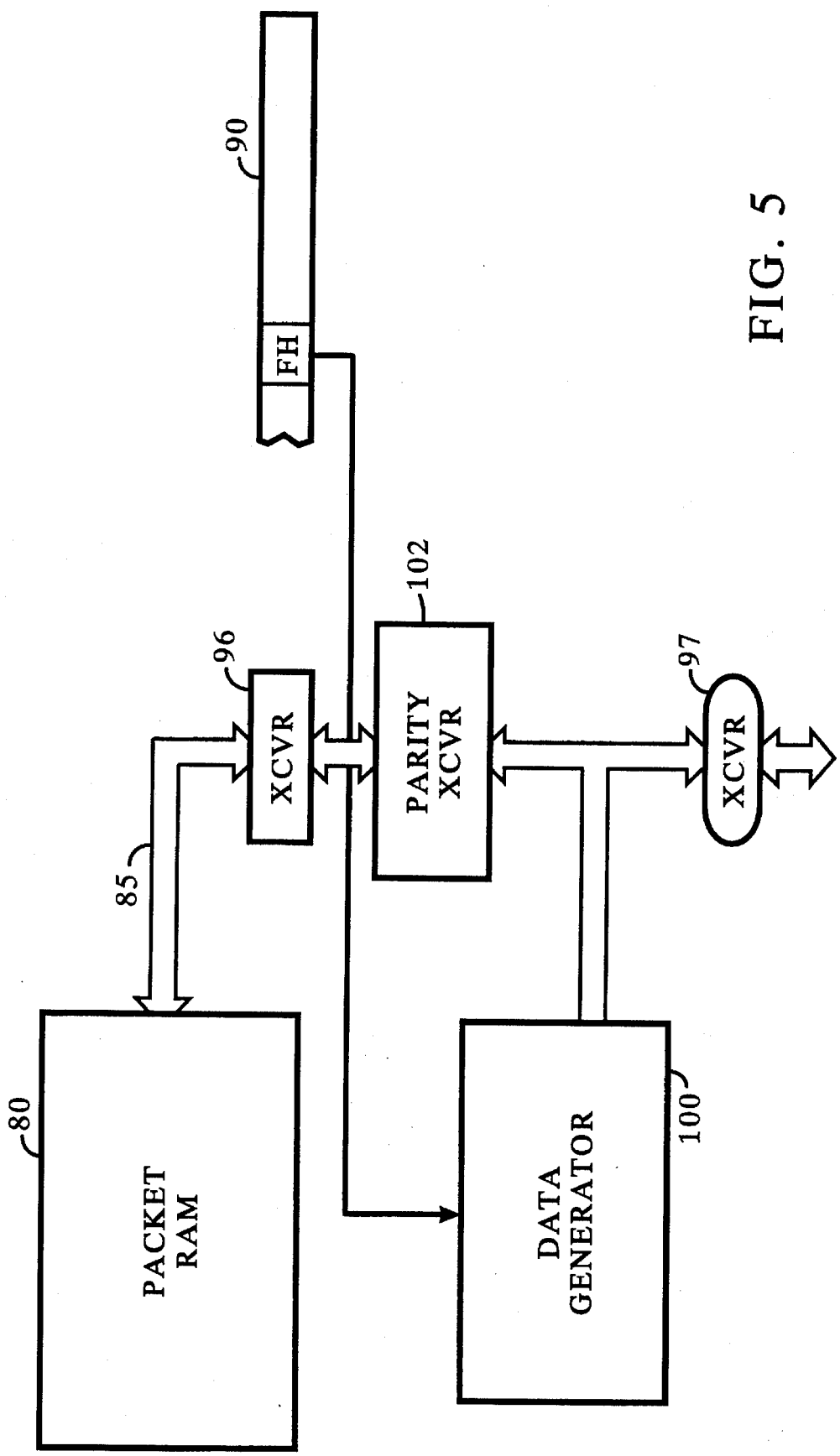
FIG. 5 is an exploded view of the DMA control circuitry shown in FIG. 2.
Figure 6:
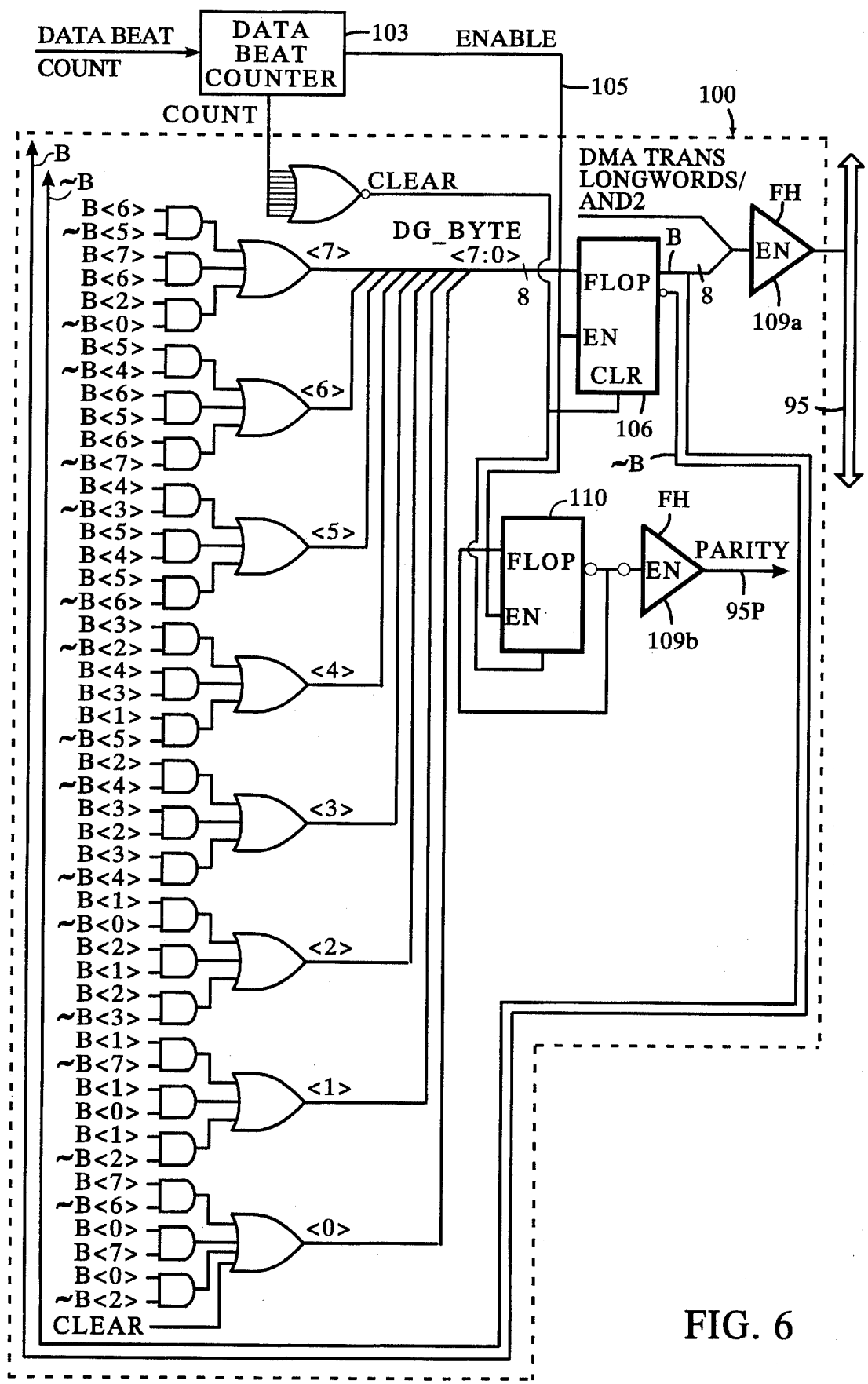
FIG. 6 is an exploded view of the parity generation logic and data generation logic shown in FIG. 2.

Referring now to FIG. 5, a given transaction stored in DMA setup register 90 can be set to provide data from the packet RAM 80, or to provide data from the Data Generation unit 100 depending on the assertion of the FH bit shown in Longword 1 in FIG. 3.

For each write transaction that does not use fast handshake mode, the data is provided from packet ram 80, passes through a transceiver 96 into a parity generating transceiver 102. The parity generating transceiver provides a parity bit for each byte of the 64 bit data path. The parity and the data are then provided to transceiver 97 for transmission to I/O bus 45.

The total delay for the typical path that does not use fast handshake mode is as follows. The delay from the assertion of an output enable on packet RAM 80, which is here comprised of 16 4K by 4 bit static RAMS manufactured by Toshiba®, is 41 nanoseconds. The transceiver 96 is a Advanced Micro Devices® 74F652 transceiver device with a propagation delay of 11.5 nanoseconds. The parity transceiver 102 is a Signetics® 74FCT833 Parity transceiver used to provide one bit of parity for each byte of data, has a propagation delay of 15 nanoseconds. Therefore, the total delay for data at transceiver 97 when not operating in fast-handshake mode is 41.5 nanoseconds.

In order to provide data at 200 MBytes/second, on a 64 bit data path, a 64-bit data word must be transmitted every 40 nanoseconds. Due to the delay through the output transceivers, and across the I/O bus 45, the maximum bandwidth is degraded by the amount of time used during the parity generation logic.

However, operating in Fast-Handshake mode results in a bypass of the parity generation logic 102, and thus permitting maximum data transfer as follows. When the fast handshake bit is set within a write command, the upper seven bytes of data provided on the data bus 95 remain constant, and are simply loaded with the second and third longword of the current dma state 81. The seven parity bits for the bus are calculated once, and provided by the parity transceiver 102 onto bus 95. Thus, the data and parity bits of the upper seven bytes remain constant for the entire data beat of the transaction.

The lower byte, however, is internally generated by a wrap-around counter which uses a Gray-code technique to provide a different and distinct data byte for each transaction.

Gray-code is a special case example of a unit distance code which are used in applications in which it is desirable to represent numerical as well as other information with a code that changes in only one bit position from one code word to the next adjacent word. Because each sequential byte differs from the previous byte in one bit location, the parity bit is calculated by inverting the value of the parity bit provided for the previous data byte.

The parity bit during data transmission is provided in the following manner. For the first byte provided on the bus, the byte value is 0, and therefore the parity bit (using odd parity) is a 1. For subsequent bytes, the byte provided in a Gray-encoded sequence of binary values and the provided associated parity bit are given by the sequence shown in Table I.

TABLE I

| Data Byte (binary) | Parity Bit |
| --- | --- |
| 00000001 | 0 |
| 00000011 | 1 |
| 00000010 | 0 |
| 00000110 | 1 |
| 00000100 | 0 |
| 00001100 | 1 |
| 00001000 | 0 |
| 00011000 | 1 |
| 00010000 | 0 |
| 00110000 | 1 |
| 00100000 | 0 |
| 01100000 | 1 |
| 01000000 | 0 |
| 11000000 | 1 |
| 10000000 | 0 |
| 10000001 | 1 |
| 00000001 | 0 |

Thus, the parity generation logic 102 is bypassed altogether, and the data is provided to the output bus pins without the incurred delay. The logic used for the Data generator 100 is here a Programmable Array Logic device from Advanced Micro Devices®, part number 22V10, with a total propagation delay of 10 nanoseconds.

Referring now to FIG. 5, an example of the Data generator device 100, shown in broken lines, receives an enable signal from a data beat counter 103 which here is used to count the number of data quadwords supplied to bus 95 for a given DMA state transaction. The data beat field is comprised of bits <8:15> of Longword 3 in the DMA state as described with reference to FIG. 3.

The data beat counter 103 provides an enable signal on line 105 which allows data to flow through flip-flop and subsequently onto bus 95. The data beat counter is here a down-counter, which begins counting at beat count −1 and continues until the count value is equal to 0. Thus, the initial value of the counter is used to provide the Clear signal on line 107 which provides the first byte of data onto the bus 95, along with the first parity bit.

In essence, the enable signal 105 allows the Gray-code unit 108 to update the lower byte of the data bus 95 with the next byte of the Gray code sequence. The FH bit of the DMA state is use to enable drivers 109a and 109b to allow the Data Gen circuit to provide the data to bus 95, rather than being provided by the packet ram 80.

The data generator device 100 provides the next byte in the above described sequence. Because the data generator device 100 is here a Programmable Array Logic (PAL) device, it is programmed by PAL code, which identifies the connections between available AND and OR gates in the PAL. Although the PAL code is not here shown, an example of logic gate connections which could be provided using the PAL code are shown in FIG. 5.

Because the byte value for each quadword of data provided to the bus 95 by the data generator device 100 is different, data can be identified as having successfully reached its destination at the appropriate receiver, and because of the identifiable series of data bytes, missed quadwords can be readily identified.

The clear signal on line 107 clears flop 110, providing a logical '1' value to driver 109b, and subsequently to parity bus 95p. Each enable signal pulse from the data beat counter 103 enables flop 110 to provide the parity signal for bus 95p. Flop 110 thus provides a toggled parity bit to bus 95p each time the enable signal on 105 is asserted.

While the above description has described providing a modified gray-code sequence for one byte of data, it is to be understood that the concept could be extended to provide a similar gray-code sequence for each byte of data by including the described PAL for each byte in the quadword. Such an arrangement would provide different and distinct data for each byte in the quadword while facilitating parity generation for the byte. In addition, although the modified gray-code has been described, any unit distance code, or any data having predictable parity may be provided for each transaction.

Thus a mechanism is described for providing identifiable and distinct data to an I/O bus with correct parity at a maximum bandwidth without incurring a delay for parity generation.

Having described a preferred embodiment of the invention, it will now become apparent to one of skill in the art that other embodiments incorporating its concepts may be used. It is felt, therefore, that this embodiment should not be limited to the disclosed embodiment, but rather should be limited only by the spirit and scope of the appended claims.

What is claimed is:

1. A method for testing a bus driving a plurality of bytes of data comprising the steps of:

providing a sequence of transactions on said bus, each transaction comprising a plurality of sequential data cycles, the data provided for each data cycle including an expected parity value and where the parity values of sequential data cycles are inversely related; and comparing, at a receiver coupled to said bus, said parity value provided on said bus against said expected parity value.

2. The method of claim 1, wherein said step of providing a sequence of transactions further comprises the step of providing to said bus a constant data value for a group of said plurality of bytes of each data cycle of the transaction, and, for at least one of said other bytes not included in said group, providing a data value for each sequential data cycle in said plurality of sequential data cycles that differs from the value of a corresponding byte in a previous data cycle by one bit location.

3. An apparatus comprising:

a memory device for storing a plurality of bus transaction descriptors;

means for executing said plurality of bus transaction descriptors to provide data to a bus, where each transaction descriptor includes means for providing a plurality of individual transactions to said bus, wherein each of said plurality of individual transactions comprise a plurality of sequential data cycles;

a data generator for generating a data value to provide to said bus for each of said plurality of sequential data cycles, said data value including a parity value, said parity values of sequential data cycles being inversely related; and a parity device, for providing said parity value for each data value provided to said bus.

4. The apparatus of claim 3, wherein said data generator further comprises:

means for providing a constant value to said bus for a plurality of bytes of said data value provided by said data generator; and means for providing a known value for at least one of the bytes of the data value provided by said data generator, wherein said known value differs in each transaction by one bit in each byte.

5. The apparatus of claim 4 wherein said means for providing a known value is a gray-code generator.

6. An apparatus comprising:

a memory device for storing a plurality of bus transaction descriptors;

means for executing said plurality of bus transaction descriptors, where each transaction descriptor provides a plurality of individual transactions to said bus, wherein each of said individual transactions includes a plurality of sequential data cycles;

a memory for storing bytes of data for each transaction;

a first parity device for providing a plurality of parity bits associated with corresponding bytes of said data stored in memory;

a data generator for generating a data value having a predictable parity value for each sequential data cycle of each transaction;

a second parity device for providing said predictable parity value for each sequential data cycle; and means for providing data and corresponding parity to said bus from either said memory device and first parity device or from said data generator device and said second parity device.

\* \* \* \* \*